US007707329B2

(12) United States Patent
Bergstedt

(10) Patent No.: US 7,707,329 B2

(45) Date of Patent: Apr. 27, 2010

(54) METHOD OF SECURING RADIOLINK FOR REMOTELY PROGRAMMABLE DEVICES

(75) Inventor: Per-Olof Bergstedt, Stockholm (SE)

(73) Assignee: Zarlink Semiconductor AB (SE)

( * ) Notice: Subject to any disclaimer, the term of this patent is extended or adjusted under 35 U.S.C. 154(b) by 696 days.

(21) Appl. No.: 11/371,126

(22) Filed: Mar. 8, 2006

(65) Prior Publication Data

US 2006/0212536 A1 Sep. 21, 2006

(30) Foreign Application Priority Data

Mar. 10, 2005 (GB) ................................ 0504844.2

(51) Int. Cl.
*G06F 3/00* (2006.01)

(52) U.S. Cl. ............................... 710/36; 710/8; 710/15; 710/16; 710/17; 710/18; 455/419; 455/26.1; 280/252; 280/254

(58) Field of Classification Search ..................... 710/8, 710/15, 16, 17, 18, 36; 455/419, 26.1; 280/252, 280/254

See application file for complete search history.

(56) References Cited

U.S. PATENT DOCUMENTS

| | | | |
|---|---|---|---|
| 5,372,607 A | 12/1994 | Stone et al. | |
| 6,043,752 A | 3/2000 | Hisada et al. | |
| 6,805,667 B2 * | 10/2004 | Christopherson et al. | 600/300 |
| 7,231,202 B2 | 6/2007 | Natsuno | |
| 7,318,172 B2 * | 1/2008 | Lou | 714/25 |
| 7,376,467 B2 | 5/2008 | Thrope et al. | |
| 7,574,368 B2 | 8/2009 | Pawlikowski et al. | |
| 2001/0016916 A1 * | 8/2001 | Mayer | 713/202 |
| 2002/0150240 A1 * | 10/2002 | Henson et al. | 380/44 |
| 2003/0194089 A1 | 10/2003 | Kansala et al. | |

FOREIGN PATENT DOCUMENTS

| | | | |
|---|---|---|---|
| EP | 1607922 | A1 | 12/2005 |
| GB | 2263004 | A | 7/1993 |
| GB | 2314180 | A | 12/1997 |
| JP | 2004246629 | A2 | 9/2004 |
| WO | 9119536 | A1 | 12/1991 |

* cited by examiner

*Primary Examiner*—Tariq Hafiz
*Assistant Examiner*—Jasjit S Vidwan
(74) *Attorney, Agent, or Firm*—Lawrence E. Laubscher, Jr.

(57) ABSTRACT

A remotely programmable device includes a message store for receiving messages over a radiolink from a controller and forwarding the messages to a local application resident in the device, writable registers for controlling operation of the device, a command interpreter for interpreting commands embedded in thessages to write data to the register, and a lock for inhibiting writing of data to the registers. The local application is responsive to an authorization code embedded in the messages to release the lock and thereby allow writing of data to the registers.

11 Claims, 3 Drawing Sheets

METHOD OF SECURING RADIOLINK FOR REMOTELY PROGRAMMABLE DEVICES

FIELD OF THE INVENTION

This invention relates to the field of programmable devices, such as pacemakers, that may be remotely programmed over a local radio communications link.

BACKGROUND OF THE INVENTION

In remotely programmable devices, such as pacemakers, a controller or master device is used to send messages over a radiolink to an application program resident in the programmable device. In addition, the local receiver contains registers that control the radiolink or perhaps perform some type of calibration in the local slave device. These can be written to by sending messages over the radiolink. If an erroneous value is written into any of these registers, the radiolink may fail, or worse. It is therefore very important that any commands that are remotely sent to the receiver cannot harm any settings in the receiver.

The controller device might either directly write to a register in the slave device, or it might send a message to the slave device, which instructs the slave device to perform this action. The problem with the first solution is that it is not secure. A malevolent user (hacker) or an ignorant user might, for example, write to a register in a way that has the effect of causing the device to cease responding to commands over the radiolink, or worse. In the case of medical devices this could be critical because a broken link might result in the correct treatment being delayed, or worse.

The problem with the second solution, where the device itself performs the action, is that it prevents the controller from performing harmless functions directly, such as writing to the local registers in the transceiver.

SUMMARY OF THE INVENTION

The present invention solves the problem by preventing the external controller from performing certain operations unless the command interpreting is unlocked by previously sending an authorization code, which may be in the form of a prime number.

Accordingly, the present invention provides a remotely programmable device, comprising a message store for receiving messages over a radiolink from a controller and forwarding the messages to a local application resident in the device; writable registers for controlling operation of the device; a command interpreter for interpreting commands embedded in said messages to write data to said registers; a lock for inhibiting writing of said data to said registers; and said local application being responsive to an authorization code embedded in said messages to release said lock and thereby allow writing of said data to said registers.

The invention offers security for maintenance functions, such as writing to the receiver registers, without the need of having a very complex controller.

In one embodiment, the lock is released by sending a large prime number over the radiolink to the local application, which then checks if its valid before releasing the lock, allowing the protected registers to be written to. It should be noted that some or all of the registers can be protected. In some embodiments, it may be useful to allow some registers to be written to without requiring release. Such registers would be registers that could not do any significant harm if the wrong data was written to them.

In another aspect the invention provides a method of controlling a remotely programmable device including writable registers for controlling operation of the device, and a local application resident in the device responsive to messages from a controller over a radiolink, and wherein commands to write data to said registers are sent over a radiolink, said method comprising said local application normally inhibiting execution of said commands; sending an authorization code to said local application to instruct said local application to permit execution of said commands; in response to said local application receiving a valid authorization code, permitting execution of said commands; and after sending a valid authorization code over said radiolink sending at least one command to write data to said registers.

DETAILED DESCRIPTION OF THE PREFERRED EMBODIMENTS

Figure 1:
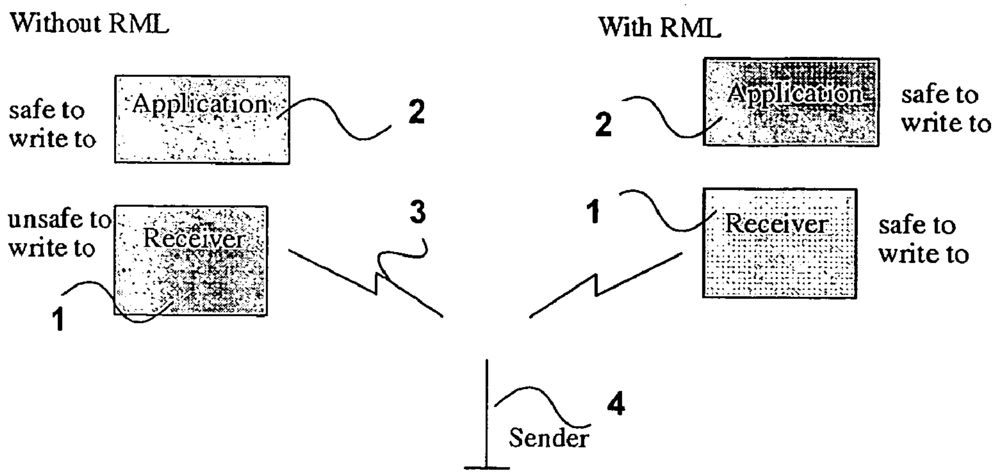
FIG. 1 is a schematic illustration showing a programmable device with and without a lock in accordance with the invention.

In FIG. 1, the programmable device on the left hand side comprises a receiver 1 and a local application 2 resident in the device that is responsive to commands over a radio link 3 from a sender 4 to perform certain operations. The sender is a controller for the device, and in the case of a pacemaker is a control unit that can be operated from outside the body to control the operation of the pacemaker.

It is generally considered safe to send commands to the local application 2 because the application can always decode and process the data and then perform the requested actions or not depending on its internal program. It is possible for some software in the application to have big security holes with automatic execution of any code or buffer overflow, but the application can be designed to run only safe software.

The receiver 1 is also responsive to commands, for example, to change its operating frequency, but unlike the local application 1 it has no means to determine whether an instruction is harmful or not.

In accordance with the invention, a lock, typically in the form of an AND gate, is provided that prevents the controller from writing to all (or some) registers or initiate commands in the receiver. The controller is only allowed to write to a few open registers while the lock is active. The programmable device can deactivate the lock and allow the controller to write to any register on upon receipt of an authorization code by the local application.

The lock itself can be in the form of a register bit, or a special pin on the receiver that needs to be activated to allow writing to take place, or a combination of both. The important point is that the local device can change the lock from a locked to an unlocked state. Once the transceiver is unlocked, the master may write to the previously disallowed registers. When the writing is performed, or after a time-out, the transceiver can be locked again.

Figure 2:
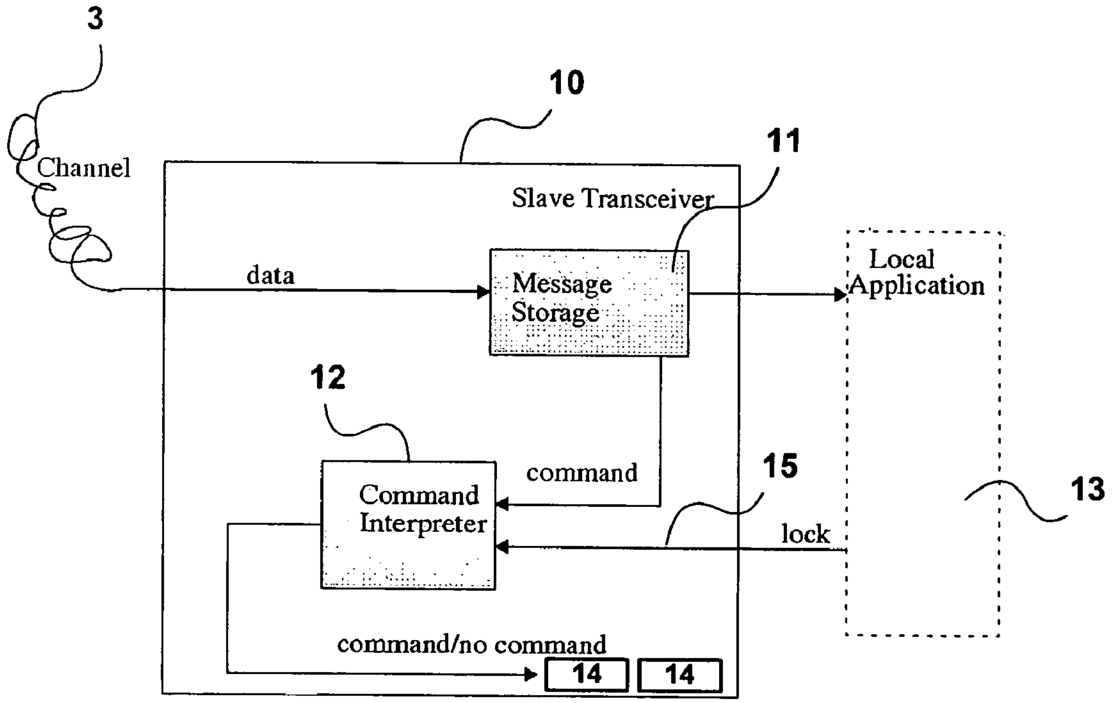
FIG. 2 is a high level block diagram of a programmable device incorporating the invention.

FIG. 2 shows a high level block diagram of programmable device in accordance with the invention.

Data, in the form of messages, are sent over the radiolink 3 and temporarily stored in message store 11 of the transceiver 10. The messages are forwarded to the local application 13, which acts on them in accordance with its internally programmed instructions.

The messages are also forwarded to command interpreter 12, which can normally write to registers 14 in the receiver in accordance with the commands received. These registers typically control the operation of the transceiver 10 in the programmable device.

The application 13 normally issues a lock signal 15, which prevents the execution of the commands from the command interpreter 12. This prevents writing of data to some or all of the registers 14 controlling the operation of the transceiver. The lock can be released by an authorization code in the form of a secret protocol, such as a large prime number in association with local time.

The lock 15 works with functions already existing in the transceiver 10. The message from the master is sent on the link 4, and temporarily stored in the message store 11. In the message store, any commands for the transceiver are extracted and sent to the command interpreter 12. If the command interpreter 12 is locked then the command is not executed. The command interpreter can then send back an error message to the controller, which will tell it that the command failed. If it is unlocked the command is executed. The command interpreter itself can detect that a command has been received, and warn the local device. Using a more complex command interpreter, such a warning can be used for the unlocking protocol.

The lock 15 is used as a security feature so that it will be impossible to remotely write to any registers in the receiver without first getting permission to do so. This permission is given by the local application. The remote application may send a request that is interpreted in the local application. The local application may then grant or deny writing to registers in the local receiver. When the remote command has been performed, the lock in the receiver may be automatically set again so that no further writing to the registers is permitted until a new authorization is received.

Figure 3:
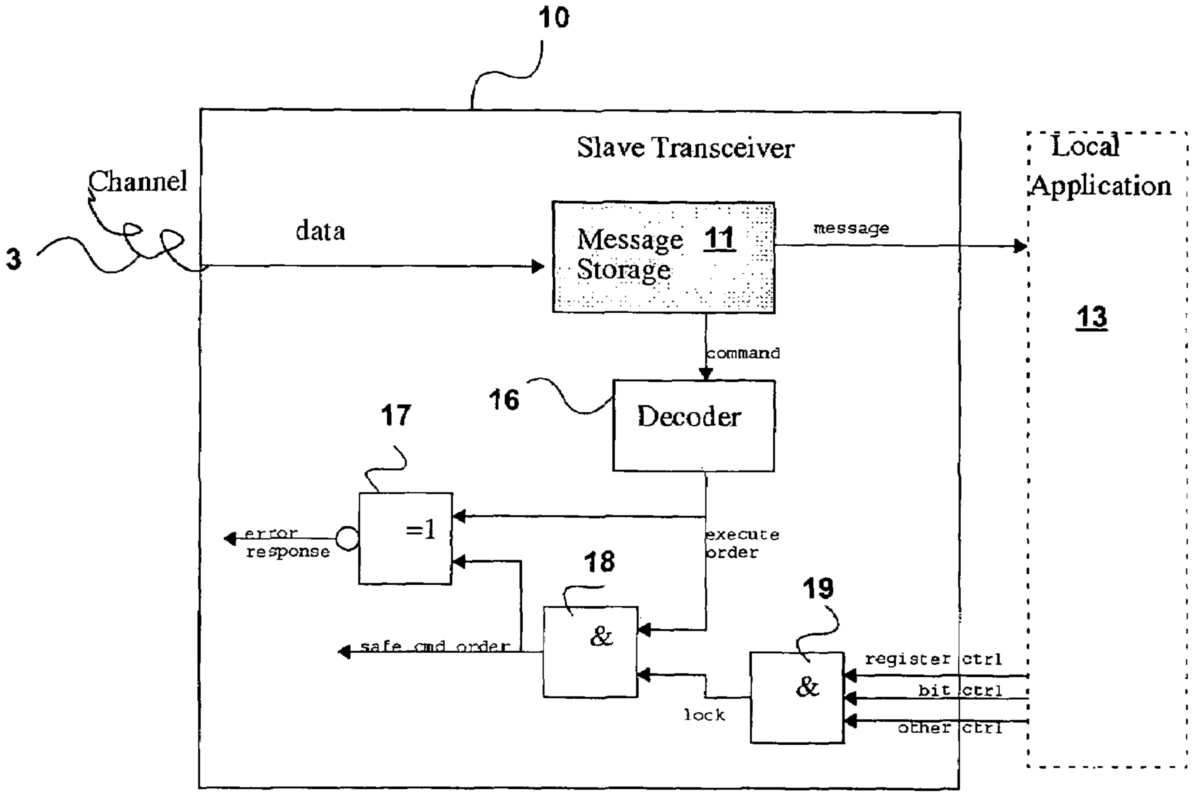
FIG. 3 shows the device in more detail.

FIG. 3 shows the command interpreter in more detail. This consists of a decoder 10 for decoding the commands contained in messages stored in the temporary message store 11. The output of the decoder is passed to an AND gate 18 whose other input is set by the output of AND gate 19 receiving its inputs from the local application 13.

The output of the decoder 16 is also passed to AND gate 17 whose other input receives the output of AND gate 18. When all three inputs of AND gate 19 coming from the local application 13 are high, gate 18 is unlocked and allows the output of the decoder to be written to registers 14. When the output of gate 19 goes low, gate 18 is locked, and the output of NAND gate 17 goes high, causing an error signal to be issued, which can be passed back to the controller over the radiolink 3.

Figure 4:
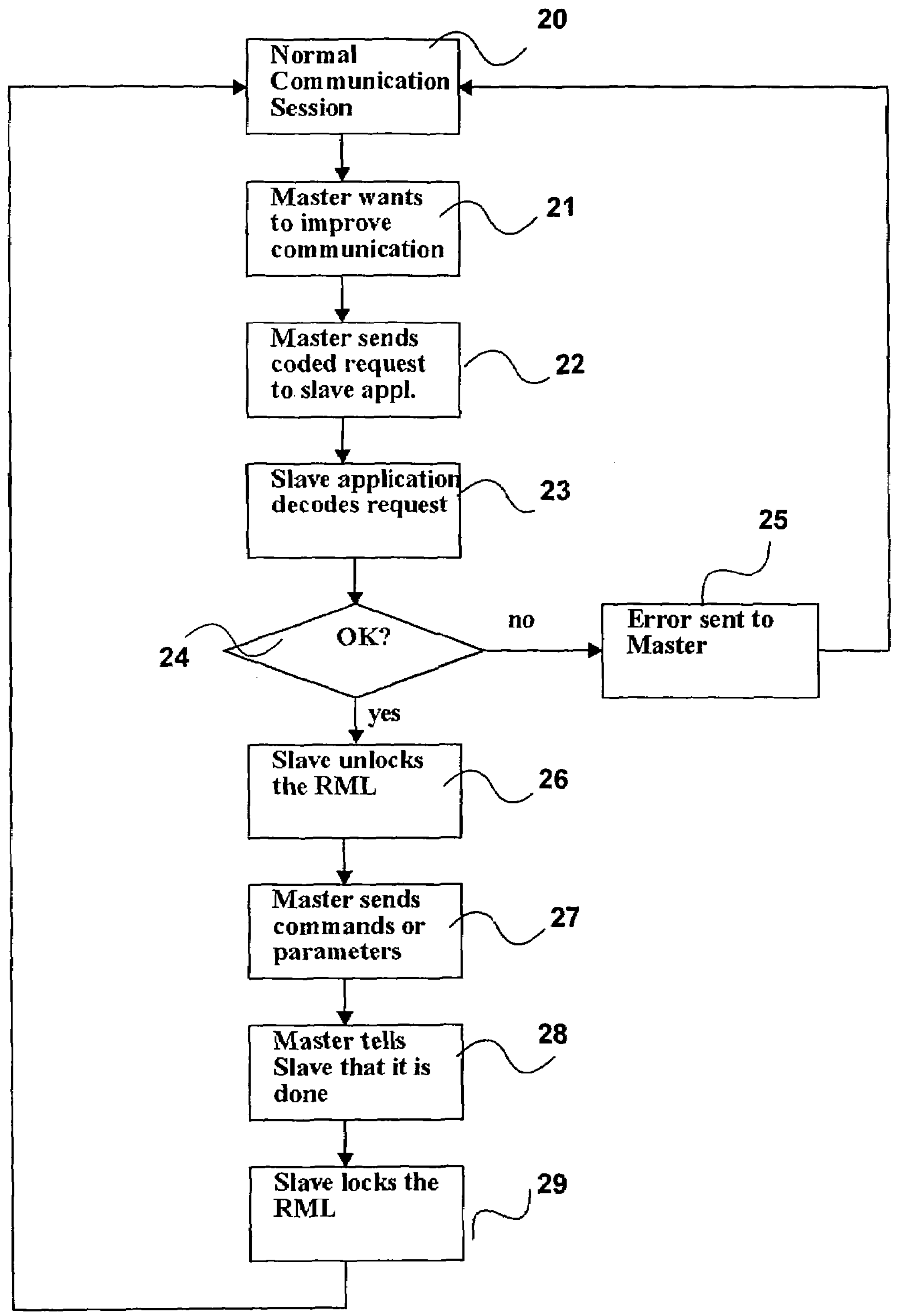
FIG. 4 is a flow chart illustrating operation of the device.

FIG. 4 is a flow chart showing the operation of the programmable device. Step 20 represents normal communication wherein messages are passed over the radiolink 3. If the master (controller) wants to improve communication (step 21), it sends a coded request or authorization code at step 22 to the programmable device (slave). This is passed to the local application, which at step 23 decodes this request. If the request is not approved, an error message is sent back to the controller at step 25. If the request is approved, the local application releases the lock at step 26. The controller then sends commands at step 27. Upon receipt of an indication from the controller that it has completed its commands, it sends a message at step 28 to advise the programmable device accordingly, which at step 29 again activates the lock.

The invention can be implemented in built in hardware. The command interpreter disallows (some or all) command to be executed if locked. Also, the local device can be warned that a command has been blocked, and in one embodiment an error message is sent back to the controller if he command fails. Certain special commands can be performed even in the lock is active.

The invention claimed is:

1. A remotely programmable device for performing an external function, comprising:

a radio receiver for receiving messages containing embedded commands over a radio link from a controller;

a plurality of writable registers controlling internal operation of the radio receiver;

an application resident in the device for acting on said commands embedded in said messages in accordance with its internally programmed instructions to perform said external function;

a command interpreter for interpreting commands embedded in said messages independently of said application to write data relating to the operation of said receiver to said writable registers;

a message store for temporarily storing said messages received over said radiolink and forwarding said messages separately to said local application and to said command interpreter;

a lock for normally inhibiting writing of said data to said registers; and said local application being responsive to an authorization code embedded in said messages to release said lock and thereby allow writing of said data to said writable registers.

2. A remotely programmable device as claimed in claim 1, further comprising logic for returning an error message over the radiolink to the controller when a command fails due to said command interpreter being locked.

3. A remotely programmable device as claimed in claim 1, wherein said command interpreter includes a decoder for decoding said messages and issuing instructions in response to received commands, and said lock comprises a logic gate responsive to an input from the local application to block execution of said instructions unless the authorization code is transmitted in a message.

4. A remotely programmable device as claimed in claim 3, wherein the local application is responsive to an authorization code transmitted in a message as a large prime number.

5. A remotely programmable device as claimed in claim 1, which is configured such that a first subset of said registers may be written to said radiolink when said lock is in a locked state, and a second subset of said registers is normally locked and may only be written to when said lock is released.

6. A remotely programmable device as claimed in claim 1, wherein said device is a pacemaker.

7. A method of controlling a remotely programmable device for performing an external function and including a radio receiver for receiving messages containing embedded commands over a radio link from a controller, writable registers for controlling internal operation of the radio receiver, and a local application resident in the device acting on said commands embedded in said messages in accordance with its internally programmed instructions to perform said external function, said method comprising:

storing said messages in a message store;

forwarding said commands from said message store separately to a command interpreter and said local application;

said command interpreter being responsive to interpret commands in said messages independently of said application to provide data to be written to said writable registers to control internal operation of the receiver;

providing a lock to normally inhibit writing of said data to said writable registers;

said local application receiving an authorization code in said messages, when it is desired to control internal operation of said receiver, to instruct said local application to release said lock;

in response to said local application receiving a valid authorization code, said local application releasing said lock; and after receiving a valid authorization code over said radiolink, said command interpreter writing said data to said writable registers.

8. A method as claimed in claim 7, wherein said device returns an error message over the radiolink to the controller when a command fails due to said command interpreter being locked.

9. A method as claimed in claim 7, wherein the local application is responsive to an authorization code transmitted in a message as a large prime number to permit execution of said commands.

10. A remotely programmable device as claimed in claim 1, wherein the commands written to said writable registers control the frequency of operation of the receiver.

11. A method as claims in claim 7, wherein the commands written to said writable registers control the frequency of operation of the receiver.

* * * * *